Feb. 5, 1952 A. CROT 2,584,333
FRUIT PRESS
Filed Dec. 17, 1946

INVENTOR.
ANDRE' CROT
BY
Ernest K. Hill
Attorney

Patented Feb. 5, 1952

2,584,333

UNITED STATES PATENT OFFICE 2,584,333

FRUIT PRESS

André Crot, North Hollywood, Calif.

Application December 17, 1946, Serial No. 716,844

7 Claims. (Cl. 100—45)

This invention relates to an improved fruit press, more particularly adapted to extract the juice from citrous fruit such as oranges, grapefruit, lemons and limes.

It is an object of this invention to provide an improved and simplified fruit press wherein no preparation or cutting of the fruit is required, the fruit being inserted whole, and crushed rather than reamed to produce a clear juice free from pulp and seeds. While fruit presses, as distinguished from reamers, have been proposed heretofore, when used on whole fruit of the thick-skinned or peel type, have tended to produce a delayed burst or pressure release of the fruit, spraying juice beyond the confines of the bowl or receptacle.

It is also an object of this invention to provide an improved fruit press of the class described herein having an improved toggle action providing maximum leverage for the final pressing stage, wherein the anchor or lever end of the toggle linkage is movable to bring the line of pressure approximately centered relative to the plunger at the bottom of the stroke, and to move back to clear the bowl at the top of its stroke.

It is a further object of this invention to provide an improved and simplified fruit press of the character described wherein plunger operating and guiding linkages are so arranged as to retract, tilt and move the plunger back to provide ready access to the bowl for placing fruit therein and removing the residue therefrom.

It is also an object of this invention to provide a fruit press of the character described wherein the bowl or fruit receptacle is readily removed for cleaning and wherein the remainder of the press is also readily cleaned and compactly organized for convenient storage.

Figure 1:
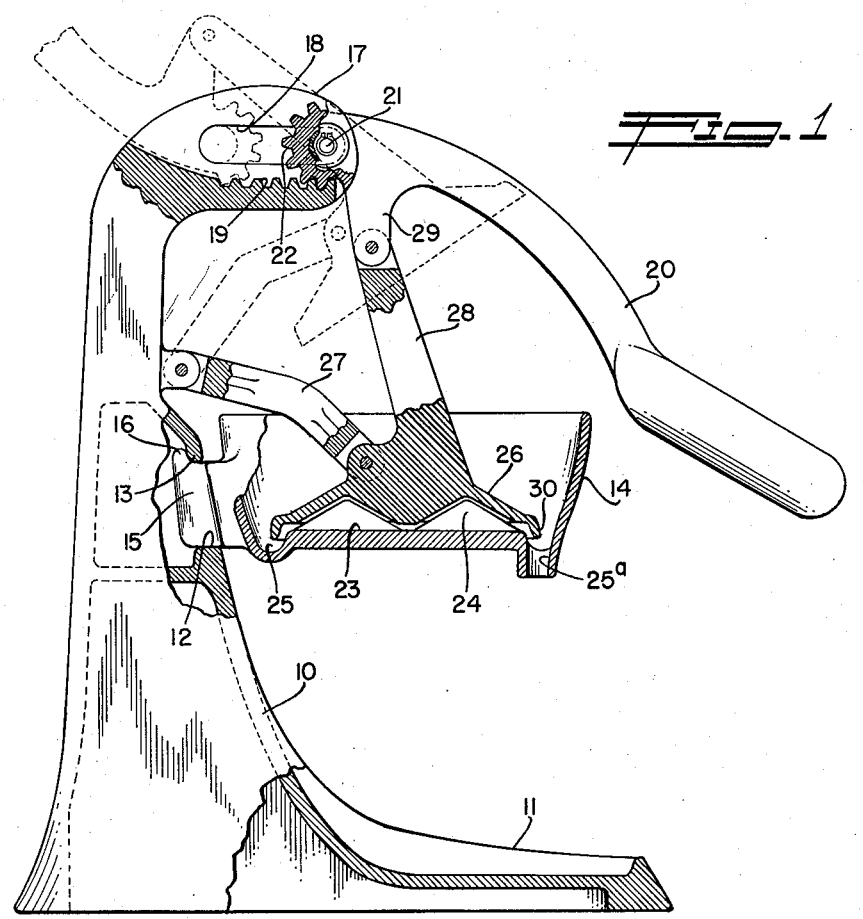
Figure 2:
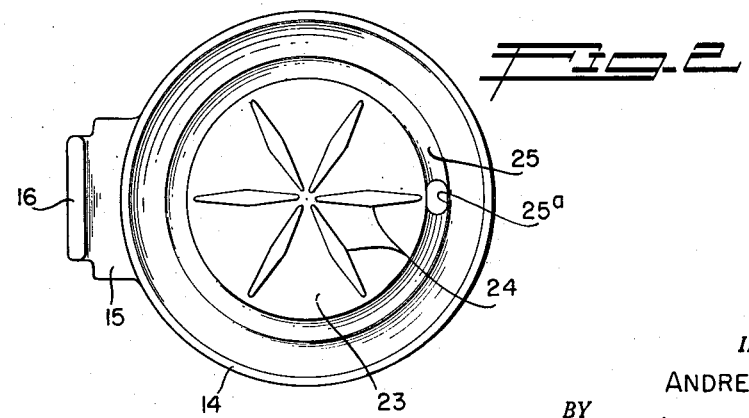

Other objects and features of the invention will be readily understood from the following detailed description of a typical preferred form of the invention wherein reference will be made to the accompanying drawings in which:

Figure 1 is a side elevation partly broken away to show details of the mechanism, of a fruit juicer embodying the features of this invention; and Figure 2 is a top view of the bowl or fruit receptacle detached from the operative position of Figure 1.

As shown in the drawings, a standard 10 has a suitable extended foot 11 to receive a suitable glass (not shown) positioned beneath the juice spout to be mentioned hereinafter. The standard extends upward to and beyond a bowl location where an aperture is provided having a lower rest 12 and an upper lip 13 for supporting a bowl 14, an extension 15 thereon having an ear 16 engaging under the lip 13 and seating on the rest 12. The standard 10 extends upwardly above the bowl location and terminates in an inturned head 17 having an elongated slot 18 and a gear rack 19 adjacent thereto.

A lever or handle 20 has a pivot 21 rolling in the slot 18, a pinion 22 coaxial with the pivot 21, engaging the rack 19 and causing the pivot to move backward or to the left as the handle is raised to the dotted line position, and to move forward as the handle is pulled down to the full line position shown.

The bowl 14 has a substantially flat circular bottom 23 provided with a plurality of radiating blades 24, the tops of which slope toward the center and periphery of the bottom, thus forming a central pocket for the fruit prior to pressing, the blades serving to cut through the peel or rind of the fruit during the pressing operation. A trough 25 surrounds the flat bottom and guides the juice to a spout 25ª. The bowl is readily removable for cleaning by merely tilting its free edge upward to release the ear 16 from behind the lip 13 on the standard.

A plunger 26, complementary to the shape of the bottom of the bowl, is pivotally guided by a link 27 pivoted to the standard 10, and is operated by a connection 28 pivoted to an offset ear 29 on the handle closely adjacent to the pivot 21 thereof; the arrangement being such that the connection 28 and ear 29 together form a toggle linkage, with the two members substantially aligned to develop maximum force when the handle bottoms the plunger. Since the connection 28 is rigid with the plunger it pivots the latter about the link 27 and thus swings the plunger up and back in cooperation with the rolling pivot 21, forming the anchor of the toggle. With this arrangement maximum clearance is obtained when the plunger is withdrawn, yet when the plunger approaches the bottom of its stroke, the toggle exerts increasing force and the rolling pivot or toggle anchor moves out toward the center of the bowl to give a more uniform distribution of pressure over the area thereof.

In the operation of the fruit juicer of this invention, it is unnecessary to cut up the fruit unless it is of excessive size, as might be the case with a large grapefruit. The handle 20 is swung up and back into the dotted line position of Figure 1 and the fruit dropped into the bowl. Bringing the handle forward and down compresses the fruit between the bowl and plunger causing the bowl knives to perforate the skin or peel of the fruit. A small flange 30 on the plunger assists in preventing upward squirting of juice as the plunger approaches the bowl bottom, and the increasing leverage afforded by the toggle action permits carrying the pressing operation as far as desired. After the desired amount of fruit has been pressed, the bowl is readily detached from the standard for cleaning, and the working face of the plunger is also exposed for ready cleaning and inspection.

It will thus be seen that I have invented an improved and simplified fruit juicer wherein a toggle action together with a movable anchor point therefor increases the leverage available as the fruit is progressively crushed and as a corollary to the rolling pivot point the plunger is withdrawn and tilted back out of the way while removing the residue from a previous operation or placing fruit in the bowl.

The fruit juicer of this invention acts primarily as a crusher or press to expel juice, rather than to macerate the pulp of the fruit. As a crusher it is also useful to crush ice or crack nuts, as the toggle mechanism provides adequate forces for such operations.

Having described only a typical form of the invention, I do not wish to be limited to the specific details herein set forth, but wish to reserve to myself any variations or modifications that may appear to those skilled in the art and/or fall within the scope of the following claims.

I claim as my invention:

1. A fruit juicer of the type described including a standard having an elongated horizontal slot in the upper end thereof, a bowl supported from said standard, an operating handle pivoted in said horizontal slot in the upper end of the standard, a rack carried by the standard, a pinion carried by the handle, said pinion being coaxial with respect to the pivotal axis of said handle and being fixed against turning movement relative to said handle, said rack and pinion intermeshing to move the handle pivot outwardly relative to the standard as the handle is operated during the fruit pressing operation, a plunger, and a pivot connecting said handle and said plunger and adapted to provide a toggle action as the handle pivot moves outwardly to force said plunger downwardly into said bowl to crush fruit disposed therein.

2. A fruit juicer of the type described including a standard having an elongated horizontal slot in the upper end thereof, a bowl supported from said standard, an operating handle pivoted in said horizontal slot in the upper end of the standard, a rack carried by said standard, a pinion carried by the handle, said rack and pinion intermeshing to move the handle pivot outwardly along said slot relative to the standard as the handle is operated during the fruit pressing operation, a plunger, means pivoting said plunger to said standard, and a pivot connecting said handle and said plunger and adapted in combination with said handle pivot movement to force said plunger downwardly into said bowl to crush fruit disposed therein.

3. A fruit juicer of the type described comprising a standard having a foot member and a head member overhanging the foot member, a handle pivoted in the head member, means adapted to move the handle pivot outwardly along the overhanging head member as the handle is operated during the juicing operation, and for retracting said handle pivot when the handle is returned to its starting position, a fruit and juice collecting bowl supported by said standard intermediate the head and foot thereof, a plunger pivotally linked to the standard in such a way as to enter said bowl to squeeze fruit disposed therein, a pivoted toggle linkage comprising one link rigid with the plunger and a second link rigid with the handle, and a common pivot connecting adjacent ends of said links together, whereby the movable handle pivot forms the anchor point of the toggle linkage, the toggle linkage being so arranged as to straighten out as the plunger is forced into said bowl.

4. A fruit juicer of the type described comprising a standard having a foot member and a head member overhanging the foot member, a handle pivoted in the head member, means adapted to move the handle pivot outwardly along the overhanging head member as the handle is operated during the juicing operation, and for retracting said handle pivot when the handle is returned to its starting position, a fruit and juice collecting bowl supported by said standard intermediate the head and foot thereof, a plunger, and a pivoted toggle linkage comprising one link rigid with the plunger and a second link rigid with the handle, whereby the movable handle pivot forms the anchor point of the toggle linkage, the toggle linkage being so arranged as to straighten out as the plunger is forced into said bowl.

5. A fruit juicer of the type described comprising a standard, a bowl supported from said standard, said standard having a foot member and a head member overhanging the foot member, a substantially horizontal rack carried by said head member, a handle swingable between upper and lower limits, a pinion carried by the inner end of said handle and fixed against turning movement with respect thereto, said pinion meshing with said rack, means pivotally connecting the inner end of said handle to said head member so that as said handle is swung toward its lower limit said pinion will ride along said rack to move the inner end of said handle outwardly along said overhanging head member and as said handle is swung toward its upper limit said pinion will ride along said rack to move the inner end of said handle in the opposite direction, a compressing plunger which cooperates with said bowl, a rigid extension carried by said plunger, a rigid extension carried by said handle, and means pivotally connecting the ends of said extensions, said extensions providing a toggle linkage and being so related that as said handle approaches its lower limit they approach aligned positions in which maximum leverage is provided.

6. A fruit juicer of the type described comprising a standard, a bowl supported from said standard, said standard having a foot member and a head member overhanging the foot member, a substantially horizontal rack carried by said head member, a handle swingable between upper and lower limits, a pinion carried by the inner end of said handle and fixed against turning movement with respect thereto, said pinion meshing with said rack, means pivotally connecting the inner end of said handle to said head member so that as said handle is swung toward its lower limit said pinion will ride along said rack to move the inner end of said handle outwardly along said overhanging head member and as said handle is swung towards its upper limit said pinion will ride along said rack to move the inner end of said handle in the opposite direction, a compressing plunger which cooperates with said bowl, a rigid extension carried by said plunger, a rigid extension carried by said handle, means pivotally connecting the ends of said extensions, said extensions providing a toggle linkage and being so related that as said handle approaches its lower limit they approach aligned positions in which maximum leverage is provided, and a link pivotally connected at one end to said standard and pivotally connected at its opposite end to said plunger, whereby as the handle is swung upwardly said plunger is tilted to provide ready access to said bowl.

7. A fruit juicer of the type described comprising a standard, a bowl supported from said standard, said standard having a foot member and a head member overhanging the foot member, said head member being channel-shaped in cross-section, having bottom and side walls, said sidewalls being slotted to provide substantially horizontal guide ways, a substantially horizontal rack carried by said bottom wall, a handle swingable between upper and lower limits, a pinion sector formed integrally with the inner end of said handle and meshing with said rack, means including said guide ways for pivotally connecting the inner end of said handle to said head member so that as said handle is swung toward its lower limit said pinion sector will ride along said rack to move the inner end of said handle outwardly along said overhanging head member and as said handle is swung toward its upper limit said pinion sector will ride along said rack to move the inner end of said handle in the opposite direction, a compressing plunger which cooperates with said bowl, a rigid extension carried by said plunger, a rigid extension carried by said handle, means pivotally connecting the ends of said extensions, said extensions providing a toggle linkage and being so related that as said handle approaches its lower limit they approach aligned positions in which maximum leverage is provided, and a link pivotally connected at one end to said standard and pivotally connected at its opposite end to said plunger, whereby as the handle is swung upwardly said plunger is tilted to provide ready access to said bowl.

ANDRÉ CROT.

REFERENCES CITED

The following references are of record in the file of this patent:

UNITED STATES PATENTS

| Number | Name | Date |
|---|---|---|
| D. 115,885 | Zurawin | July 25, 1939 |
| 194,457 | Newsam | Aug. 21, 1877 |
| 252,871 | Fanning | Jan. 31, 1882 |
| 486,387 | Snaith | Nov. 15, 1892 |
| 703,517 | Baumgarten | July 1, 1902 |
| 1,345,963 | Santos | July 6, 1920 |
| 1,500,217 | Anderson | July 8, 1924 |
| 1,850,001 | D'Annunzio | Mar. 15, 1932 |

FOREIGN PATENTS

| Number | Country | Date |
|---|---|---|
| 659,683 | France | Feb. 5, 1929 |